April 5, 1960     W. H. ROYER     2,931,322
LEVEL OVEN LOADER AND UNLOADER
Filed June 1, 1956     6 Sheets-Sheet 1

INVENTOR.
Wayne H. Royer
BY
*Otto Moeller*
Attorney

INVENTOR.
Wayne H. Royer
BY
Otto Moeller
Attorney

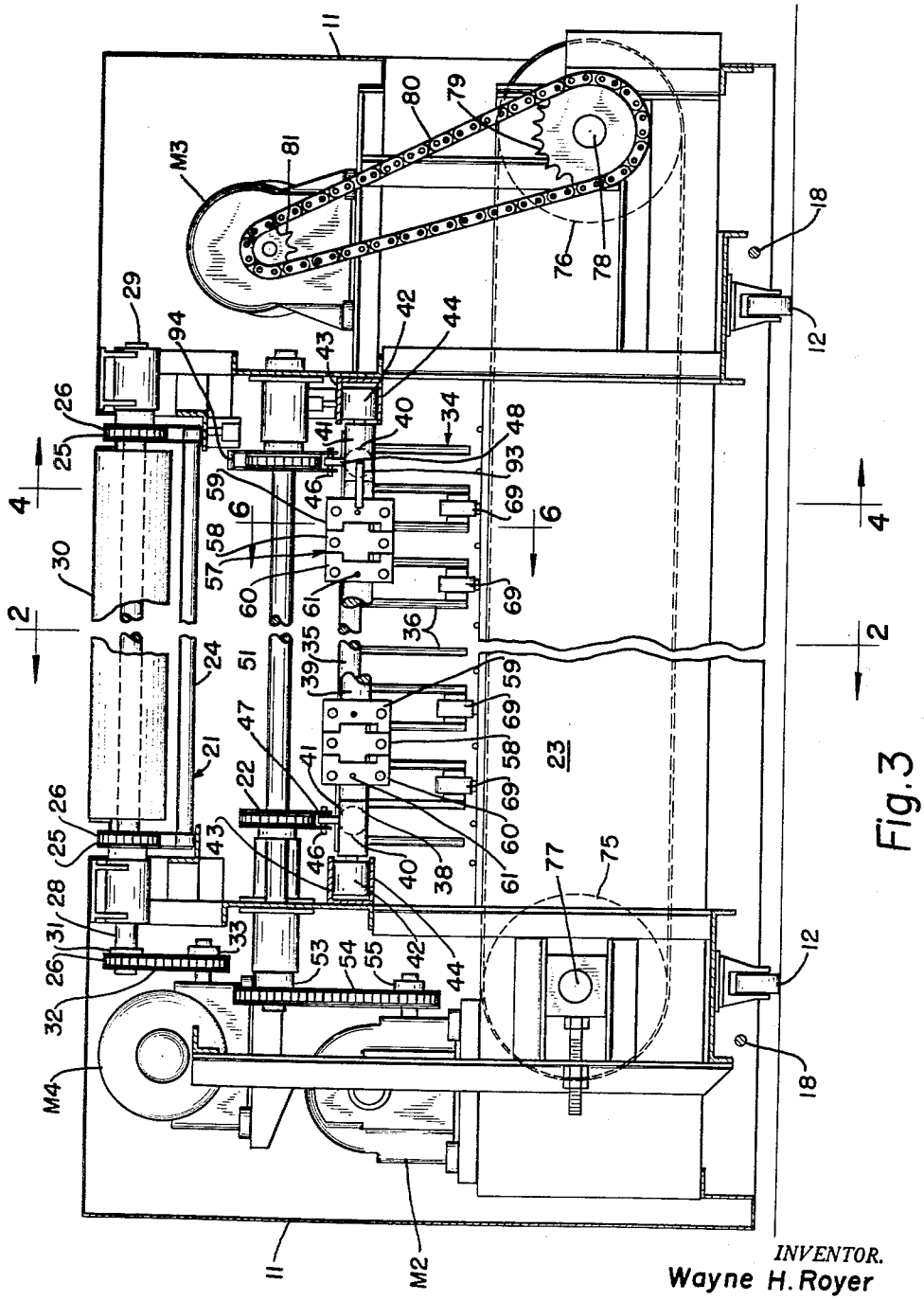

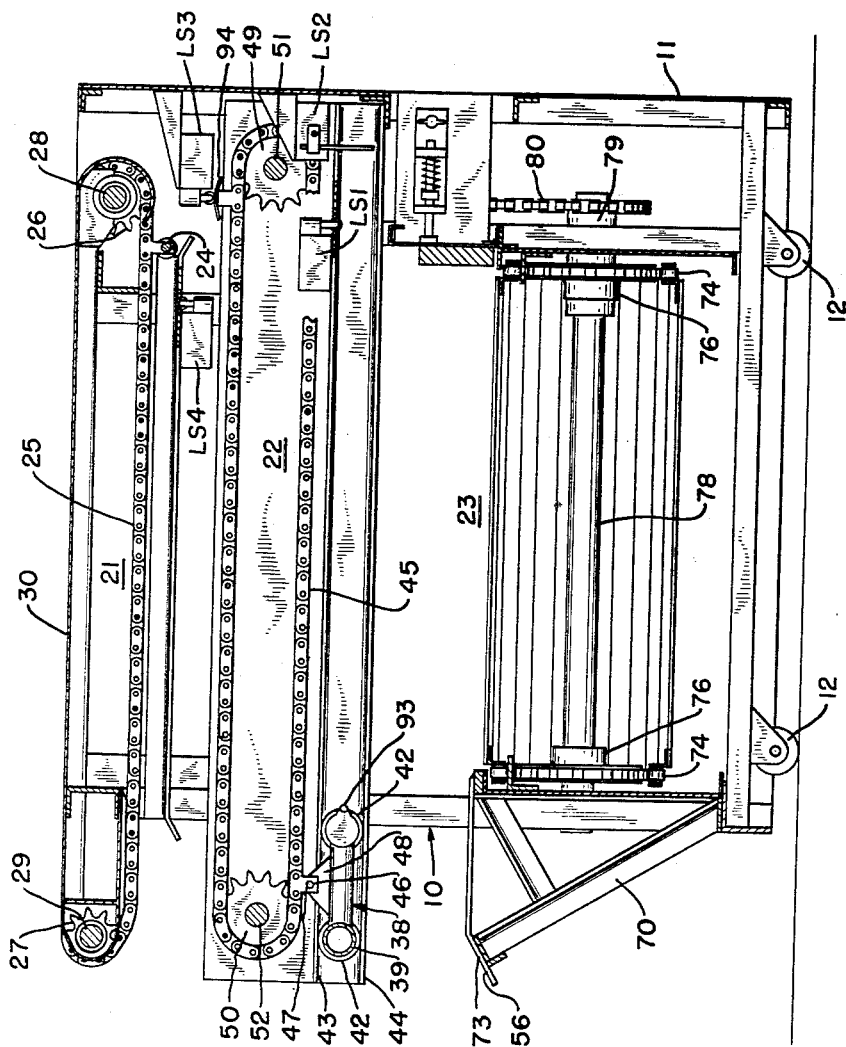

April 5, 1960 W. H. ROYER 2,931,322
LEVEL OVEN LOADER AND UNLOADER
Filed June 1, 1956 6 Sheets-Sheet 5

INVENTOR.
Wayne H. Royer
BY
Attorney

April 5, 1960 W. H. ROYER 2,931,322
LEVEL OVEN LOADER AND UNLOADER
Filed June 1, 1956 6 Sheets-Sheet 6

INVENTOR.
Wayne H. Royer
BY
Otto Moeller
Attorney

United States Patent Office 2,931,322
Patented Apr. 5, 1960

2,931,322

LEVEL OVEN LOADER AND UNLOADER

Wayne Henry Royer, York, Pa., assignor, by mesne assignments, to Capital Products Corporation, a corporation of Pennsylvania Application June 1, 1956, Serial No. 588,769

9 Claims. (Cl. 107—57)

This invention relates to a traveling tray type oven and particularly to means for loading pans of dough to be baked onto and unloading pans of baked goods from the oven trays. The oven to which the present invention is particularly adapted comprises an endless conveyor traveling in a closed loop in the baking chamber, the conveyor being provided with a series of equidistantly spaced trays having a pan supporting shelf.

It is customary in order to unload the pans of baked goods from the oven trays, to tilt the trays as they approach the front of the oven adjacent their arcuate path of travel from the lower to the upper run of the tray conveyor, thereby permitting the pans to slide by gravity from the trays onto a transversely extending take-away conveyor that transports the pans from the oven. Such tilting of the trays to unload the pans of baked goods is objectionable, particularly in the case of pies or cakes having a soft filling, since the filling material has a tendency to flow, resulting in an imperfect final product. In addition, the shock incidental to the pans striking the take-away conveyor as they slide from the tilted trays, has a tendency to impair the soft baked products. It is, therefore, an object of the present invention to provide unloading means for pans of baked goods from an oven that maintains the pans in level horizontal position throughout the removal of the pans from the oven trays and the transporting of the pans to and depositing them on the take-away conveyor.

Another object is to provide a novel level pan unloader that is portable and movable as a unit into or out of operative association with the oven.

A further object is to provide novel loading and unloading means for delivering pans of products to be baked to and removing pans of baked products from the trays of an oven of the type described above, through a common opening in the oven front wall. A related object is to provide a novel level oven loader and unloader of the type described that is portable and movable as a unit into or out of operative association with the oven.

The novel loader and unloader structure includes vertically spaced horizontal loading pan supports and unloading pan supports disposed outside the oven and extending into an opening in the oven front wall terminating adjacent the vertical run of an endless tray conveyor, a sweep member movable over the loading pan support for engaging and slidingly moving the pans over the loading pan support onto an alined tray of the tray conveyor and a rake member movable over a tray of the tray conveyor alined with the unloading pan support for engaging pans and slidingly moving them off the tray onto the unloading pan support. It is further contemplated that the portion of the unloading pan support outside the oven include a take-away conveyor onto which the rake moves the pans, whereby the pans are removed from the loader and unloader structure. The invention further includes means for operating the sweep member, rake member and take-away conveyor in timed relation with the tray conveyor of the oven, and control means for energizing and de-energizing these various elements in appropriate timed relation with respect to each other, to provide rapid and accurate loading, unloading and removal of pans.

Other objects and advantages more or less ancillary to the foregoing and the manner in which all of the various objects are realized will become apparent in the following description which, considered in connection with the accompanying drawings, sets forth the preferred embodiment of the invention.

In the drawings:

Figure 3 is a section on line 3—3 of Figure 1;

Figure 4 is a sectional view of the loader and unloader taken on line 4—4 of Figure 3, looking in the direction of the arrows;

Figure 1:
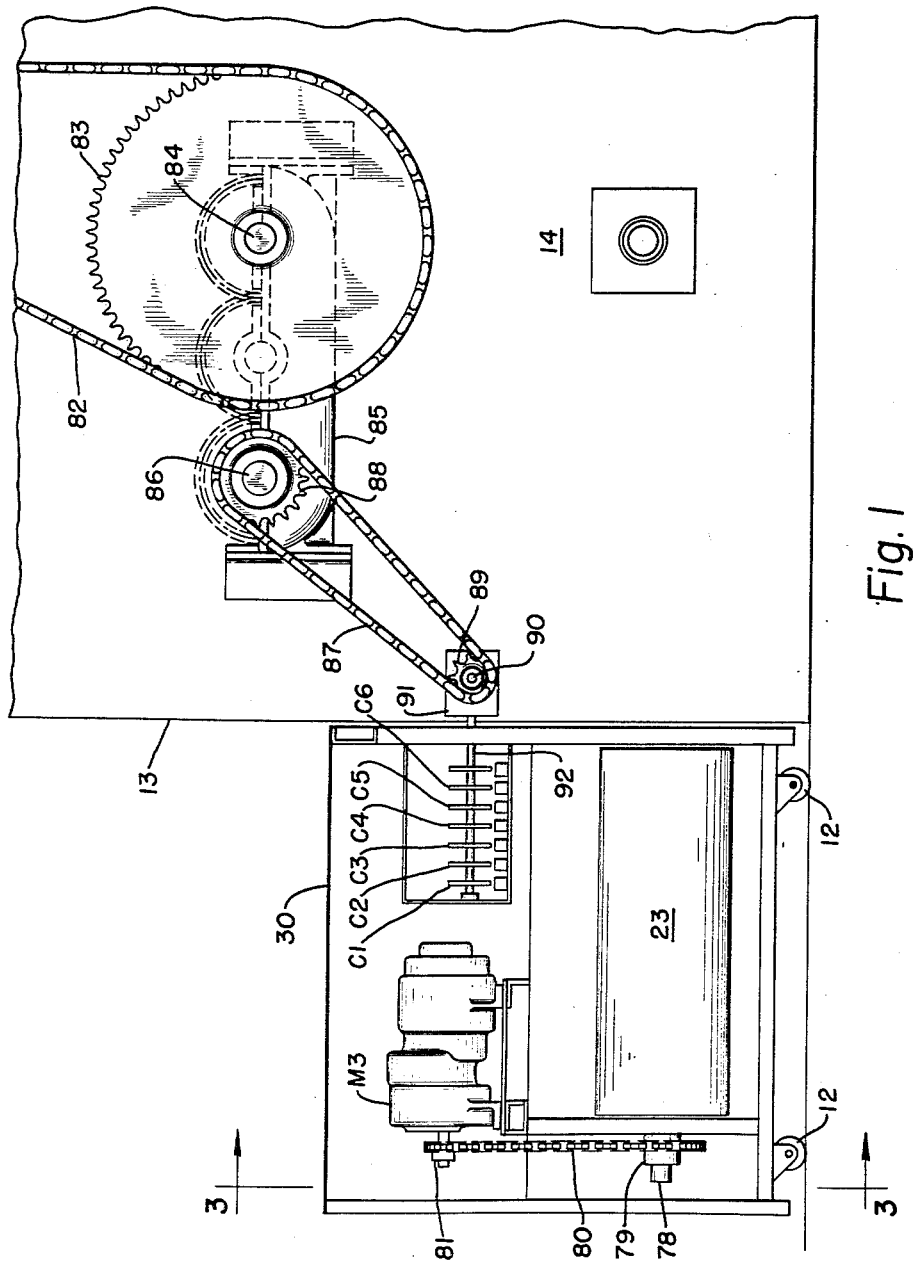
Figure 1 is a view in side elevation of the loader and unloader and a portion of the oven to which it is applied, showing the drive means for the oven tray conveyor and the cam bank controlling the operation of the various elements of the loader and unloader.

The portable level oven loading and unloading device embodying my invention includes an upright, generally rectangular frame structure 10, made up of angle irons and other structural elements. Sheet metal panels 11 are secured to and partially enclose the frame structure 10. For convenient portability the frame structure 10 is mounted on casters 12, whereby the device may be moved into or out of operative relation with respect to the front wall 13 of the oven 14.

Figures 2, 6:
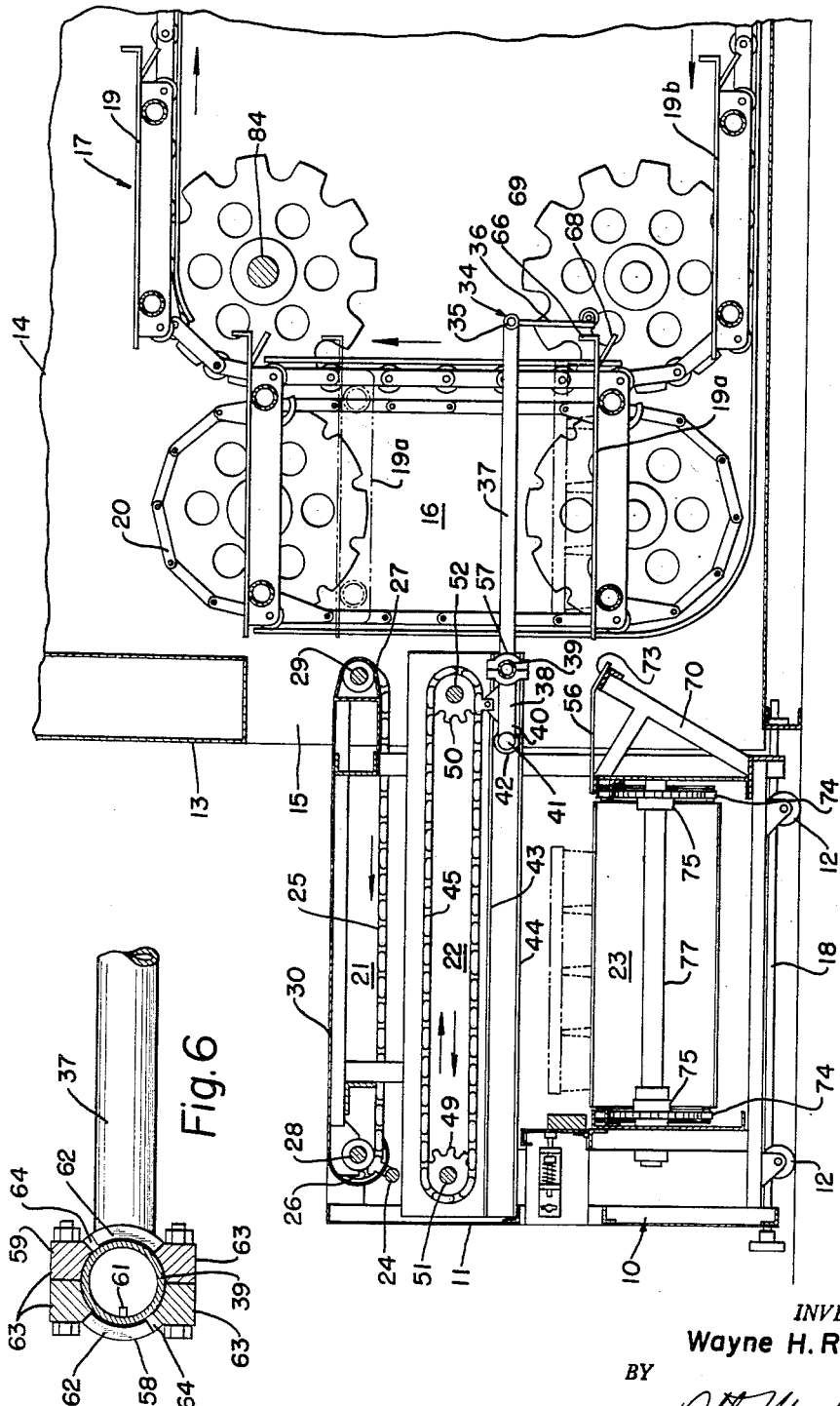
Figure 2 is a longitudinal vertical sectional view through the loader and unloader and the adjacent portion of the oven, looking in the direction of the arrows on line 2—2 of Figure 3.
Figure 6 is an enlarged sectional view taken on line 6—6 of Figure 3.

When in operative position, portions of the loading and unloading elements of the device project through an opening 15 in the oven front wall 13 terminating adjacent the vertical run 16 of the oven tray conveyor 17, as best shown in Figure 2. Suitable means, such as latch rods 18 carried by the frame structure 10, are provided for securing the device to the oven 14, the rearward ends of the latch rods 18 extending through and being suitably secured to the lower forward end of the oven frame structure 10.

The tray conveyor includes a plurality of equidistantly spaced trays 19 arranged to be moved in an endless path, in the direction of the arrows in Figure 2, by endless chains at opposite sides of the oven. Suitable means, including an endless chain 20, are provided for stabilizing or maintaining the trays in horizontal position. The endless chain 20 is provided with a plurality of equidistantly spaced hook members arranged to engage and support a forward end portion of successive trays 19 as they are moved in an upward direction along the front of the oven, as shown in Figure 2. The specific tray conveying means and tray stabilizing means do not constitute a part of the present invention, and are therefore not described in detail.

Mounted on the frame structure 10 in vertical spaced relation are, from top to bottom, a loader 21 for moving successive transverse rows of pans of dough onto successive trays 19 of the tray conveyor 17, an unloader 22 for removing successive transverse rows of pans of baked products from successive trays 19 of the tray conveyor 17, and a take-away conveyor 23 for conveying away successive rows of pans of baked products delivered thereto by the unloader 22.

The loader 21 is of the sweep means type and includes a transversely extending sweep bar 24 supported at its ends by transversely spaced longitudinally extending endless chains 25, each chain being trained at one end around a sprocket 26 and at its other end around a sprocket 27. The sprockets 26 are fixed on a transversely extending shaft 28 carried by suitable bearings adjacent the forward end of the frame structure 10, and the sprockets 27 are fixed on a transversely extending shaft 29 carried by suitable bearings on a rearward extension of the frame structure 10. Thus with the device in operative position adjacent the front wall 13 of the oven, the rearward end of the loader 21 extends through the opening 15, terminating adjacent the vertical run 16 of the tray conveyor 17, as shown in Figure 2. Between the chains 25 and slightly above the upper runs thereof is a loading platform 30 which is suitably supported on the frame structure 10. The platform 30 is adapted to support a row of pans of dough, which may be delivered onto the platform manually or by mechanical transfer means. The sweep bar 24 is disposed above the level of the loading platform 30 during the upper run of its movement by the chains 25, so that with the chains operating in the direction of the arrow, the sweep bar 24 will push a row of pans of dough along the loading platform 30 onto a tray 19a in alinement therewith. The loader 21 is actuated intermittently and in timed relation with other elements of the device and the tray conveyor 17, as and for the purpose to be later described.

To drive the loader 21, a sprocket 31 is fixed on an extension of the shaft 28 around which is trained a chain 32, the latter also being trained around a sprocket 33 on the shaft of an electric motor M4.

The unloader 22 is of the rake type and includes a rake 34 comprising at the rearward end thereof a transversely extending rake bar 35, a plurality of laterally spaced rake fingers 36 rigidly secured to and depending from the bar 35, and a longitudinally extending rake bar 37 secured near each end of the transversely extending bar 35 and extending forwardly therefrom. One or more additional rake bars 37 (not shown) may be provided between the end rake bars 37 if necessary to provide rigidity to the rake 34. The rake 34 is supported in horizontal position by a carriage 38, to which carriage the forward ends of the longitudinally extending rake bars 37 are attached in a manner to be hereinafter described.

Figure 5:
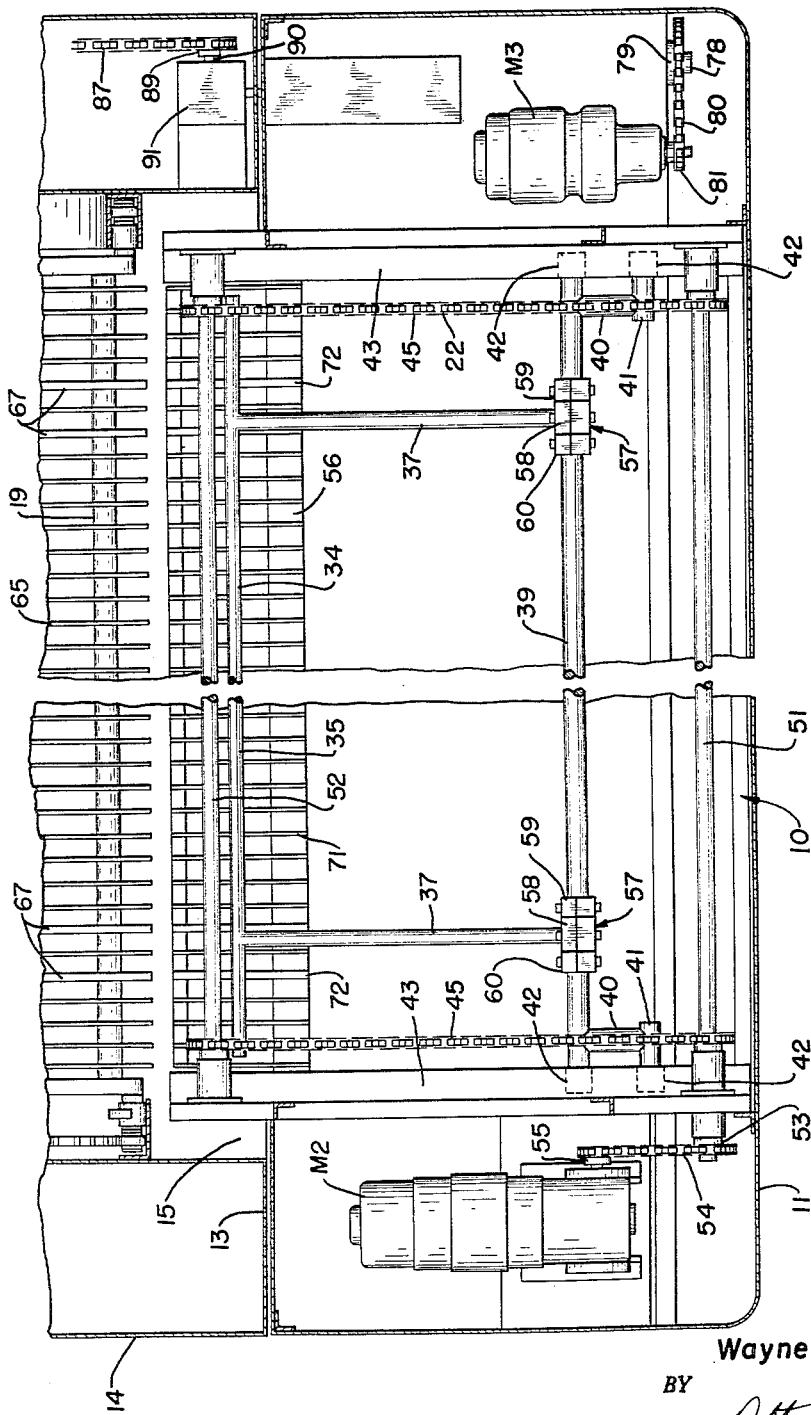
Figure 5 is a sectional plan view of the loader and unloader and the adjacent portion of the oven.

The carriage 38 includes a transversely extending bar 39 to which are attached the rearwardly extending rake bars 37 as best shown in Figure 5. Welded or otherwise suitably secured to the carriage bar 39 near each of its opposite ends is a forwardly extending short bar 40, and to the forward end of each of the short bars 40 there is welded or otherwise suitably secured a short laterally outwardly extending short bar 41 coterminous with respect to the respective end of the carriage bar 39. Each end of the carriage bar 39 as well as the outer or free end of each of the short laterally extending bars 41 carries a roller 42. The top and bottom peripheral portions of the rollers 42 are adapted to be engaged by laterally spaced, longitudinally extending upper and lower track members 43 and 44. The track members 43 and 44 are suitably supported by the frame structure 10 and extend from adjacent the forward end thereof beyond the rearward end thereof so as to project into the opening 15 of the oven 14. The carriage 38 is adapted to roll back and forth in the tracks 43 and 44, and is maintained in horizontal position by reason of engagement of the tracks with the tandem arranged rollers 42, thereby also maintaining the rake 34 in horizontal position during such back and forth movement. The carriage 38 is attached at its respective laterally spaced ends to the lower runs of respective laterally spaced longitudinally extending endless chains 45, as by pins 46 extending through overlapping lugs 47 and 48 secured respectively to the chains 45 and the bars 40 of the carriage 38.

Each of the chains 45 is trained at one end around a sprocket 49 and at its other end around a sprocket 50. The sprockets 49 are fixed on a transversely extending shaft 51 carried by suitable bearings adjacent the forward end of the frame structure 10, and the sprockets 50 are fixed on a transversely extending shaft 52 carried by suitable bearings on a rearward extension of the frame structure 10, which projects into the opening 15 of the oven front wall 13. The rake 34 of the unloader has a reciprocating movement and the operating means therefor includes a sprocket 53 fixed on an extension of the shaft 51, around which sprocket is trained a chain 54, the latter also being trained around a sprocket 55 on the shaft of a reversible electric motor M2. Thus, when the motor M2 is operated in one direction, the rake 34 is moved to its extended position, as shown in Figure 2, with the rake fingers 36 located at the rear of a row of fans on a tray 19a in position to be unloaded. Upon reversal of the motor M2, the rake 34 moves to its retracted position, being shown in almost fully retracted position in Figure 5, whereby the rake fingers 36 engage a row of pans on a tray 19a and sweeps the row of pans off the tray 19a across a grid-like supporting shelf 56 onto the take away conveyor 23. The rake 34 is then again moved to extend position before the next tray 19b arrives at the unloading station.

The rake 34 is attached to the bar 39 of the carriage 38 for slight upward pivotal movement from its normal horizontal position to compensate for slight upward or downward variations in the stopping of a tray at the unloading station. Such pivotal movement is provided for by clamps 57, one of which will now be described, it being understood that the other clamp or clamps are of the same construction.

The clamp 57 includes a center clamp member 58 and end clamp members 59 and 60, each of which is preferably split for convenience in mounting them on the carriage bar 39, the sections of each clamp member being secured together by suitable bolts. Referring particularly to Figures 3, 5 and 6, the center clamp member 58 is rigidly fixed to the forward end of a longitudinally extending rake bar 37 and is rotatably mounted on the carriage bar 39. End clamp members 59 and 60 are rigidly secured to the carriage bar 39 by suitable means, such as the pins 61. As best shown in Figures 3 and 6, the center clamp member 58 has a pair of laterally projecting, diametrically opposite arcuate tongues 62 loosely interengageable with a pair of laterally projecting, diametrically opposite arcuate tongues 63 of the end clamp member 59. The loosely interengageable tongues providing spaces 64 therebetween permits slight rotational movement of the center clamp member 58 about the carriage shaft 39 whereby the rake 34 has a slight pivotal movement. A similar interengageable tongue arrangement is provided between center clamp member 58 and end clamp member 60.

The pan supporting surface of each tray 19 is in the form of a grid comprising a plurality of longitudinally extending, laterally spaced rods 65, as best shown in Figure 5, having upturned rearward end portions 66, as shown in Figure 2, which serve as stops to arrest rearward movement of the pans during the loading operation. Several of the rods 65 of the trays 19 are replaced by track members 67, as shown in Figure 5, the rearward ends 68 thereof being bent downwardly at an angle as seen in Figure 2. Certain of the fingers 36 of the rake 34 are provided at their lower ends with rollers 69 which are adapted to engage the sloping ends 68 of the track members 67 upon retracting movement of the rack 34. This arrangement facilitates upward pivotal movement of the rack 34, to prevent fouling of the rake fingers 36 against a tray 19 and thereby provides for a certain latitude in the unloading position of a tray 19.

The grid-like shelf 56, across which the row of pans is swept by the rake 34 from a tray 19 to the take-away conveyor 23, extends into the oven opening 15 and is supported in horizontal position by bracket means 70 attached to the frame structure 10. The shelf 56 is formed of laterally spaced rods 71, as shown in Figure 5, and is provided with track members 72 alined with the track members 67 of a tray 19 when in unloading position, so that the rollers 69 of the rake fingers 36 roll therealong. The rearward ends of the track members 72 are bent downwardly as at 73 to facilitate upward pivotal movement of the rake upon engagement therewith of the rollers. Thus fouling of the rake fingers against the shelf 56 by reason of misalignment is prevented.

The take-away conveyor 23 may be of any suitable type, a slat type conveyor for example, the slats of which are attached at their ends to a pair of spaced laterally extending endless chains 74. Each of the chains 74 is trained at one end around a sprocket 75 and at its other end around a sprocket 76. The sprockets 75 are fixed on a longitudinally extending shaft 77 carried by suitable bearings adjacent one side of the frame structure 10, and the sprockets 76 are fixed on a longitudinally extending shaft 78 carried by suitable bearings adjacent the other side of the frame structure 10. The operating means for the take-away conveyor 23 includes a sprocket 79 fixed on an extension of the shaft 78, around which sprocket is trained a chain 80, the latter also being trained around a sprocket 81 on the shaft of an electric motor M3.

Figure 8:
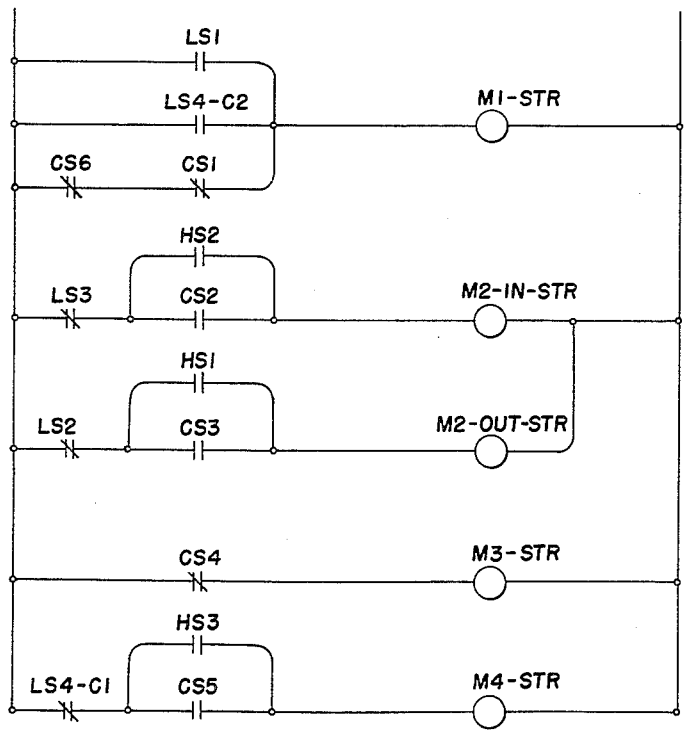
Figure 8 is a diagrammatic view of the electrical circuit of the apparatus.

The operating means for the tray conveyor 17 includes a motor, not shown, but the starter for which is designated in the electrical diagram, Figure 8, as M1–STR. Around a sprocket on the shaft of this motor is trained a chain 82, shown in Figure 1, the chain 82 being also trained around a sprocket 83 mounted on an extension of the tray conveyor drive shaft 84. Suitable gearing, not shown, in the gear housing 85 operatively connects the tray conveyor drive shaft 84 with a stub shaft 86. A chain 87 is trained at one end around a sprocket 88 on the stub shaft 86 and at its other end around a sprocket 89 mounted on a shaft 90 of a gear reducer 91 which in turn operates the cam shaft 92. Mounted on cam shaft 92 are cams C1, C2, C3, C4, C5 and C6, which constitute part of the control system for synchronizing the operations of the tray conveyor 17, loader 21, unloader 22 and take-away conveyor 23. The reduction gearing and relation of the sprockets is such that the cams C1 to C6 make one revolution for each advance of a tray 19 through one tray space.

Figure 7:
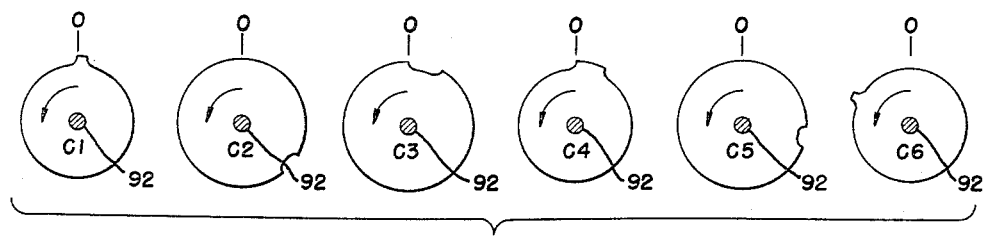
Figure 7 is a diagrammatic representation of the cams of the cam bank for controlling the various elements of the invention.

The sequence of operation of the various elements described above and the means for controlling the sequence of events will now be explained in detail. In Figure 7 the cams C1 to C6 are shown in their relative positions with respect to a point O, which point O represents the unloading position, i.e., the position at which tray 19a registers with take-away conveyor 23, as shown in Figure 2, and the point at which actuation of the various cam switches is initiated. With the cams C1 to C6 turning in counterclockwise direction, as indicated by the arrows in Figure 7, it is apparent that they are depicted in a position when a tray 19, for example tray 19a, is just about to move into unloading position, and at such time the switches CS1, CS2, CS3, CS4, CS5 and CS6 which are operatively connected, in well known manner, with cams C1, C2, C3, C4, C5 and C6, respectively, are as shown in the wiring diagram, Figure 8. Referring to Figure 8, it will be seen that at such time the circuit to tray conveyor motor starter M1–STR is complete through normally closed cam controlled switches CS6 and CS1 so that the tray conveyor motor controlled by starter M1–STR is operating to move tray 19a into unloading position. At this time, the circuit to take-away conveyor motor starter M3–STR is complete through normally closed cam controlled switch CS4 so that take-away conveyor motor M3 is operating to actuate the take-away conveyor 23 for removing a row of pans.

The instant tray 19a reaches the unloading position, the raised portion of cam C1 opens cam switch CS1, thereby breaking the circuit to the tray conveyor motor starter M1–STR to stop the tray 19a in unloading position, and stopping rotation of cam shaft 92 which as previously explained is actuated by the tray conveyor motor (not shown). At the same time, the raised portion of cam C4 opens cam switch CS4, thereby breaking the circuit to take-away conveyor motor starter M3–STR to stop the take-away conveyor 23. Also at the same time, the depressed portion of cam C3 causes normally open cam switch CS3 to close, thereby completing the circuit to the reversible unloader rake motor starter M2-out-STR to operate unloader rake motor M2 in a direction for moving the rake 34 to its out or retracted position. During such movement of the rake 34, a row of pans is pushed from tray 19a across the shelf 56 and onto the take-away conveyor 23. When cam switch CS3 closes, hold switch HS1 also closes, the reason for hold switch HS1 being hereinafter explained.

As the rake 34 moves out to retracted position, a roller 42 of the rake carriage 38 engages a limit switch LS1, as is apparent in Figure 4, the limit switch LS1 being positioned along the track 43 to be engaged by the roller 42 shortly after the rake fingers 36 have cleared the tray 19a. Upon engagement of the roller 42 with normally open limit switch LS1, the latter closes to complete a circuit to the tray conveyor motor starter M1–STR, whereupon tray 19a moves upwardly from its unloading position. Engagement of roller 42 with limit switch LS1 is of sufficient duration to permit the raised portion of cam C1 to ride off normally closed cam switch CS1, permitting the latter to re-close and thereby again completing the circuit to tray conveyor motor starter M1–STR to provide for continued upward movement of tray 19a.

Since the tray conveyor motor (not shown) is now operating, it is apparent that the cams C1 to C6 are also rotating, and the reason for hold switch HS1 becomes clear. As previously explained, at the instant the tray 19a reaches the unloading position, the cam switch CS3 closes by reason of its engagement with the depressed portion of cam C3, in other words, the cam C3 has moved counterclockwise just a slight distance from that shown in Figure 7. Now, with the cam C3 again rotating upon operation of the tray conveyor motor (not shown) as above described, it is clear that cam switch CS3 re-opens as soon as cam C3 rotates a distance to cause cam switch CS3 to ride on the high part of cam C3, however, since hold switch HS1 remains closed, the circuit to rake motor starter M2-out-STR is maintained through the hold switch to permit continued travel of the rake fingers 36 across the shelf 56 to move the pans onto the take-away conveyor 23. When the rake 34 has reached this latter position, a pin 93 carried by the rake carriage 38, as shown in Figure 4, engages and opens a normally closed limit switch LS2. As shown in Figure 8, opening of limit switch LS2 breaks the circuit to rake motor starter M2-out-STR, causing the rake to stop in its fully out or retracted position. At that particular time, cam C4 has rotated to a point where its raised portion rides off cam switch CS4, permitting cam switch CS4, which was previously held open, to re-close and complete the circuit to take-away conveyor motor starter M3–STR, whereupon take-away conveyor 23 operates to remove the pans.

When tray conveyor 17 approaches the loading position, shown in phantom in Figure 2, and prior to reaching such loading position, cam C5 has rotated to position O where its depressed portion permits normally open cam switch CS5 to close, thereby completing a circuit to loader sweep motor starter M4–STR through a normally closed contact of a limit switch, LS4–C1 and effecting operation of sweep conveyor 21 by motor M4. Initiating operation of sweep conveyor 21 prior to arrival of the tray 19a in the loading position, permits the sweep member 24 to move from its rest position, as shown in Figure 2, into engagement with the pans on the loading platform 30 and to push them rearwardly into position for transfer onto the tray 19a at the time tray 19a reaches the loading position. In this manner the stopping time of the tray 19a at the loading station for receiving a row of pans is reduced to a minimum. Hold switch HS3 which closes with the closing of cam switch CS5, maintains the circuit to loader sweep conveyor motor starter M4–STR when the depressed portion of cam C5 passes position O to re-open cam switch CS5. At the same time that tray 19a is moving toward the loading position, tray 19b is moving toward the unloading position, and prior to arrival of tray 19b at the unloading position, when the depressed portion of cam C2 reaches position O, normally open cam switch CS2 closes, completing a circuit to the reversible unloader rake motor starter M2-in-STR to operate unloader rake motor M2 in a direction for moving the rake 34 to its in or extended position, i.e., to the position shown in Figure 2. Hold switch HS2 which closes with the closing of cam switch CS2, maintains the circuit to rake motor starter M2-in-STR when the depressed portion of cam C2 passes position O to re-open cam switch CS2. When the rake 34 reaches the said in or extended position, a shoe 94 carried by the rake operating chain 45 engages and opens the normally closed limit switch LS3, as shown in Figure 4, thereby breaking the circuit to rake motor starter M2-in-STR, whereupon rake motor M2 stops with the rake in its in or extended position.

Even while the rake 34 is approaching its in or extended position, the tray 19a will have reached the loading position, as shown in phantom in Figure 2. The raised portion of cam C6 is so disposed that at the time tray 19a reaches the loading position, it will be at position O where it opens cam switch CS6 breaking the circuit to tray conveyor motor starter M1–STR, whereupon the tray conveyor motor controlled by starter M1–STR stops with the tray 19a in loading position. At that time the sweep member 24, as previously described, has moved a row of pans in position to be loaded on tray 19a. Continued movement of sweep member 24 pushes the row of pans onto tray 19a and after disengaging the pans continues moving along the lower run of the chains 25. Near the forward end of the lower run of chains 25 the sweep member 24, as shown in Figure 4, momentarily engages and overruns limit switch contact LS4–C1, and in such momentary engagement causes limit switch contact LS4–C1 to open momentarily breaking the circuit to loader sweep motor starter M4–STR, whereby loader sweep member 24 stops in its rest position.

At the same time that sweep member 24 engages and opens limit switch contact LS4–C1, it also closes a second contact of limit switch LS4, designated in the wiring diagram as LS4–C2. Closing of limit switch contact LS4–C2 completes a circuit to tray conveyor motor starter M1–STR, whereby the tray conveyor motor causes tray 19a to move upwardly from its loading position. Operation of the tray conveyor motor, as previously described, causes the cams C1 to C6 to start rotating, so that the raised portion of cam C6 moves out of engagement with cam switch CS6 whereby cam switch CS6 will close and complete the circuit to tray conveyor motor starter M1–STR permitting continued operation of the tray conveyor motor when limit switch contact LS4–C2 is re-opened after having been momentarily engaged and closed by sweep member 24.

Now when the raised portion of cam C1 again reaches position O, at which point tray 19b is in unloading position, cam switch CS1 opens, stopping the tray conveyor motor starter M1–STR and the cycle is ready to be repeated.

Although I have disclosed an exemplary embodiment of my invention herein, it will be understood that various changes, modifications and substitutions may be incorporated in such embodiment without departing from the spirit of the invention.

I claim:

1. A portable pan loading and unloading device for an oven having an opening in the front wall thereof and having an endless conveyor therein carrying a plurality of equidistantly spaced trays, the endless conveyor including a vertical run adjacent said opening; said loading and unloading device comprising a supporting frame adapted to be disposed adjacent said oven opening; vertically spaced upper and lower horizontal pan supports mounted on said frame and pan support extensions extending beyond said frame and projecting through said oven opening to a point adjacent the vertical run of said tray conveyor; a sweep member mounted on said frame and movable between retracted and extended positions over the surface of one of said pan supports and its extension for engaging the pans on said one of said pan supports and slidingly moving them along said one of said pan supports and its extension onto successive trays of said tray conveyor; a single rake member permanently and movably carried by said frame for movement between retracted and extended positions over successive trays of said tray conveyor alined with the other of said pan supports and also movable over the extension of said other pan support for engaging pans on successive trays and slidingly moving them off said successive trays and across said last named extension onto said other pan support; and power driven means on said supporting frame for actuating said sweep member and said rake member.

2. In combination with a pan loading and unloading device in accordance with claim 1, power driven means for actuating said tray conveyor, and control means operated in timed relation with said tray conveyor for initiating operation of said sweep member and said rake member to deliver pans onto and remove pans from trays in alinement with said vertically spaced upper and lower horizontal pan supports.

3. A device in accordance with claim 2, in which said control means includes means for interrupting operation of said power driven means to stop said tray conveyor when a tray is in alinement with a pan support.

4. In a baking oven provided with an opening in the front wall thereof, an endless tray conveyor in said oven including a series of pan supporting trays, said conveyor being movable in a path to bring successive trays in close proximity to said opening, a horizontal pan supporting shelf having an outer pan removing conveyor portion outside said oven and an inner portion extending through said opening to a point adjacent the path of said trays, a rake member movable between retracted and extended positions over a tray of said tray conveyor and said inner pan supporting shelf portion in a path for engaging pans and slidingly moving them off said tray and across said inner pan supporting shelf portion onto said outer pan removing conveyor portion, means for operating said tray conveyor, a reversible motor for operating said rake member, a bank of cams operated in timed relation with said tray conveyor, said bank of cams including cam means for de-energizing said tray conveyor operating means to stop said tray conveyor when a tray is in alinement with said pan supporting shelf and for simultaneously energizing said reversible rake motor to move said rake member to retracted position for raking pans from said tray across said inner pan supporting shelf portion onto said outer pan removing conveyor portion, means responsive to retraction of said rake member across said tray to said inner pan supporting shelf portion for energizing said tray conveyor operating means, means responsive to further retraction of said rake member across said inner pan supporting shelf portion for de-energizing said rake motor, said bank of cams also including cam means for energizing said reversible rake motor to move said rake member to extended position when said stripped tray has moved a distance sufficient to clear the path of movement of said rake member to said extended position and prior to alinement of the next succeeding tray with said pan supporting shelf, and means responsive to said rake member upon reaching its extended position for de-energizing said reversible rake motor.

5. A device in accordance with claim 4 including a motor for operating said pan removing conveyor to remove pans moved thereon by said rake member, and wherein said bank of cams includes means for de-energizing said pan removing conveyor motor during retraction of said rake member.

6. In a baking oven provided with an opening in the front wall thereof, an endless tray conveyor in said oven including a series of pan supporting trays, said conveyor being movable in a vertical path to bring successive trays in close proximity to said opening, vertically spaced upper and lower pan supports, said upper pan support having an outer pan supporting portion outside said opening and an inner pan supporting portion projecting through said opening and terminating adjacent the vertical path of said tray conveyor and said lower pan support including an outer pan removing conveyor outside said opening and an inner pan supporting portion projecting through said opening and terminating adjacent the vertical path of said tray conveyor, a sweep member movable between retracted and extended positions over the surface of the outer and inner portions of said upper pan support for engaging pans on said upper pan support and slidingly moving them along the outer and inner portions of said upper pan support onto successive trays of said tray conveyor, a rake member movable between retracted and extended positions over a tray of said tray conveyor alined with said lower pan support and over the inner portion of said lower pan support for engaging pans on an alined tray and slidingly moving them off said tray and across the inner portion of said lower pan support onto the pan removing conveyor of said lower pan support, and means for operating said tray conveyor, sweep member and rake member in timed relation including control means for interrupting operation of said tray conveyor when a tray is in alinement with a pan support, and for initiating operation of said sweep member and said rake member respectively to deliver pans onto and remove pans from a respective tray upon alinement of said tray with a respective pan support.

7. In a baking oven provided with a loading opening, an endless tray conveyor in said oven including a series of pan supporting trays, said conveyor being movable in a path to bring successive trays in close proximity to said loading opening, a horizontal pan supporting shelf having an outer portion outside said oven adapted to support pans and an inner portion extending through said loading opening to a point adjacent the path of said trays, an intermittently operated sweep member movable between retracted and extended positions across the top surface of said shelf in a path for engaging the pans on the outer portion of said shelf and slidingly moving them across said outer and inner shelf portions onto successive trays of said tray conveyor, actuating means for said tray conveyor, actuating means for said sweep member, sequential control means operated in timed relation with said tray conveyor for de-energizing said tray conveyor actuating means upon alinement of a tray with said shelf and for energizing said sweep actuating means an interval prior to de-energizing of said tray conveyor actuating means whereby said sweep member moves the pans across the outer portion of said shelf and onto the inner portion thereof to bring the leading sides of said moving pans adjacent said tray simultaneously with the arrival of said tray in alinement with said shelf, and control means having an actuating element operable by said sweep member after said sweep member has moved the pans onto said tray for energizing said tray conveyor actuating means.

8. In a baking oven provided with a loading opening, an endless tray conveyor in said oven including a series of pan supporting trays, said conveyor being movable in a path to bring successive trays in close proximity to said loading opening, a horizontal pan supporting shelf having an outer portion outside said oven adapted to support pans and an inner portion extending through said loading opening to a point adjacent the path of said trays, an intermittently operated sweep member movable between retracted and extended positions across the top surface of said shelf in a path for engaging the pans on the outer portion of said shelf and slidingly moving them across said outer and inner shelf portions onto successive trays of said tray conveyor, actuating means for said tray conveyor, actuating means for said sweep member, sequential control means operated in timed relation with said tray conveyor for de-energizing said tray conveyor actuating means upon alinement of a tray with said shelf and for energizing said sweep actuating means an interval prior to de-energizing of said tray conveyor actuating means whereby said sweep member moves the pans across the outer portion of said shelf and onto the inner portion thereof to bring the leading sides of said moving pans adjacent said tray simultaneously with the arrival of said tray in alinement with said shelf, and control means having actuating elements operable by said sweep member after said sweep member has moved the pans onto said tray for energizing said tray conveyor actuating means and de-energizing said sweep actuating means.

9. In a baking oven provided with an opening in the front wall thereof, an endless tray conveyor in said oven including a series of pan supporting trays, said conveyor being movable in a path to bring successive trays in close proximity to said opening, a horizontal pan supporting shelf having an outer pan removing conveyor portion outside said oven and an inner portion extending through said opening to a point adjacent the path of said trays, a rake member movable between retracted and extended positions over a tray of said tray conveyor and said inner pan supporting shelf portion in a path for engaging pans and slidingly moving them off said tray and across said inner pan supporting shelf portion onto said outer pan removing conveyor portion, actuating means for said tray conveyor, actuating means for said rake member, sequential control means operated in timed relation with said tray conveyor, said sequential control means including means for de-energizing said tray conveyor actuating means when a tray is in alinement with said pan supporting shelf and for simultaneously energizing said rake actuating means to move said rake member to retracted position for raking pans from said tray across said inner pan supporting shelf portion onto said outer pan removing conveyor portion, means responsive to retraction of said rake member for energizing said tray conveyor actuating means and de-energizing said rake actuating means, said sequential control means also including means for energizing said rake actuating means to move said rake member from retracted to extended position when said stripped tray has moved from its position in alinement with said pan supporting shelf a distance sufficient to clear the path of movement of said rake member to said extended position and prior to alinement of the next succeeding tray with said pan supporting shelf, and means responsive to said rake member upon reaching its extended position for de-energizing said rake actuating means.

References Cited in the file of this patent

UNITED STATES PATENTS

| | | |
|---|---|---|
| 564,074 | Hitchner | July 14, 1896 |
| 891,817 | Copland | June 30, 1908 |
| 1,420,567 | Mueller | June 20, 1922 |
| 1,795,352 | Sundbom | Mar. 10, 1931 |

FOREIGN PATENTS

| | | |
|---|---|---|
| 696,123 | Great Britain | Aug. 26, 1953 |